Aug. 14, 1934.　　　　L. G. SIMJIAN　　　　1,969,910
MULTI-POSE REFLECTING APPARATUS
Filed June 20, 1932

INVENTOR
LUTHER G. SIMJIAN
by George H. Elwell
ATTY

Patented Aug. 14, 1934

1,969,910

UNITED STATES PATENT OFFICE 1,969,910

MULTI-POSE-REFLECTING APPARATUS

Luther G. Simjian, New Haven, Conn.

Application June 20, 1932, Serial No. 618,282

11 Claims. (Cl. 45—99)

This invention relates to multi-pose-reflecting apparatus, and its objects are to provide a pose-reflecting apparatus of such novel combination of mirrors that a person is thereby enabled to see his reflection at various angles, in bust or full length image, without changing the angle of any mirror; to provide a pose-reflecting apparatus adapted for use in dress salons where it is desirable to show different angles of a person's figure without the usual adjustment of mirrors; and to provide a novel combination of fixed mirrors in different sets of which one set has a concealed mirror in pose-reflecting association with certain visible mirrors, the image-reflecting path of such said set being outside of the image-reflecting path of the other visible mirrors comprising the other set.

The practice now in common use in establishments employing mirrors for the reflected display of gowns upon a prospective purchaser has long since introduced a combination of which one mirror is used for full front view and other mirrors being arranged in such relative manner, one to the others, as to show the side view of the poser who turns to face such mirrors. This practice, however, has proved to be very unsatisfactory because the poser seems more than one image reflected in the mirror he is facing, and furthermore it is almost impossible to see the back view of himself for the reason that part of his body lies in the image-reflecting path of his back view. The disadvantage of such present mirror combination of pose-reflection, therefore, is that it is almost impossible for the poser to see any of his angle reflections, one at a time, without interference by other reflections which are always confusing.

The pose-reflecting apparatus about to be disclosed avoids all extraneous reflections by providing such a combination of mirrors that will enable the poser to look through a separate opening and into a mirror in line therewith and see but one image-reflection, and then, by turning and looking through another opening and into another mirror, see another image-reflection at a different angle than that of the first, the elimination of all extraneous image-reflections making it possible for the poser to concentrate upon one image-reflection at a time. Such apparatus including a peculiar combination of fixed mirrors alone may be confined to such combination or, as preferred, may also include a cabinet enclosing a pose-reflecting area excluding exterior light and supporting the various mirrors in the combination and defining the image-reflecting paths as a guide to the poser.

Figure 1:
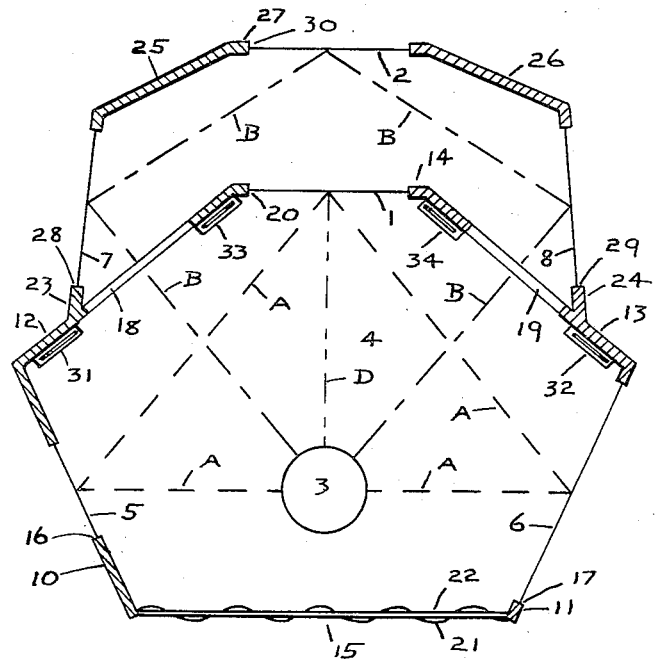
Figure 2:
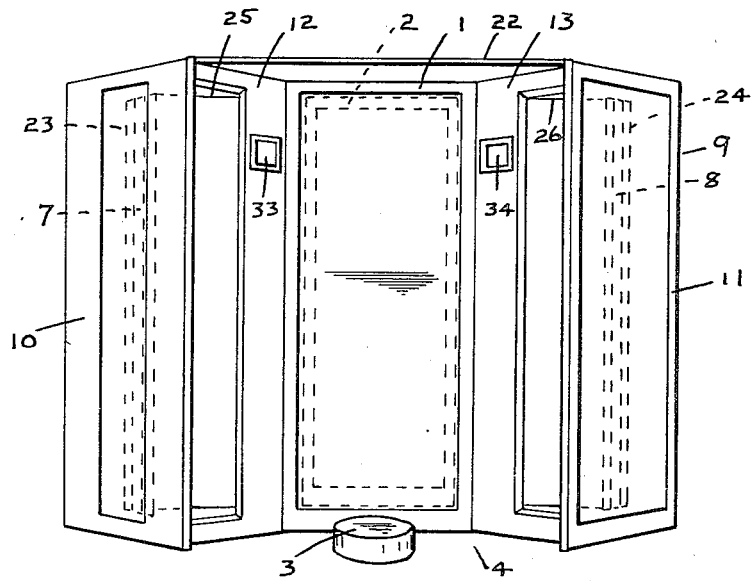

The general character of the improved apparatus may be understood best by reference to an illustrative arrangement of mirrors embodying the invention, and illustrated by the drawing of which the Figure 1 is a diagrammatic plan view of mirror arrangement and illustrating certain cabinet portions partly in cross-section; and the Figure 2 is an upright elevation of the cabinet supporting mirrors illustrated in full and dotted lines.

Referring more particularly to the drawing, the forwardly facing center mirrors 1 and 2 are axially spaced, one from and behind the other, so that the mirror 1 conceals the mirror 2 from the view of a person looking into the mirror 1 from the center 3 of the pose-reflecting area 4. Laterally spaced from one another, and upon opposite sides of the pose-reflecting area 4, are the side mirrors 5 and 6 angularly or obliquely arranged relative to the center mirror 1 so that the combination of the mirrors 1, 5 and 6 establishes an image-reflecting path A from the center 3 of the pose-reflecting area 4 to either mirror 5 or 6 and between each of the mirrors 5 and 6 and the center mirror 1. In addition to the combination of mirrors thus established by the arrangement of the mirrors 1, 5 and 6, a second combination of other mirrors is included in the apparatus by means of the concealed center mirror 2 and the side mirrors 7 and 8 laterally spaced from, and upon opposite sides of, the center mirror 1, the side mirrors 7 and 8 being angularly or obliquely arranged relative to the concealed center mirror 2 so that the combination of the mirrors 2, 7 and 8 establishes an image-reflecting path B from the center 3 of the pose-reflecting area 4 to either mirror 7 or 8 and between each of said mirrors 7 and 8 and the concealed center mirror 2, the image-reflecting path B of the last-mentioned combination being outside of the image-reflecting path A of the first-mentioned combination, but both image-reflecting paths A and B emanating from the center 3 of the pose-reflecting area 4. The center mirrors 1 and 2 provide a center mirror unit combining the combinations.

The cabinet 9 not only provides a support for the various mirrors of the pose-reflecting apparatus, but also helps to define the image-reflecting paths A and B. The main body of the cabinet 9 is illustrated as having side walls 10, 11, 12, 13 and 14 and the open side 15 which altogether substantially provides a hexagonal closure enclosing the pose-reflecting area 4. The cabinet, while illustrated as having an open top, may be provided with a closed top to exclude exterior light, if desired. The rearwardly diverging side walls 10, 11, the rearwardly converging side walls 12, 13, and the side wall 14 are each provided with an opening 16, 17, 18, 19 and 20, respectively and the openings 16, 17 and 20 each have within, or adjacent thereto, the mirrors 5, 6, and 1, respectively, each of said mirrors having a reflecting surface facing the pose-reflecting area 4 the opening 15 providing an entrance to the cabinet interior, the entrance being provided with a drapery 21 hung upon the horizontal pole 22 the extremities of which are supported by the side walls 10 and 11. Secured to the side walls 12 and 13 of the cabinet is the cabinet extension comprising the walls 23, 24, 25, 26 and 27, the walls 23, 24 and 27 having the openings 28, 29 and 30, respectively, the said openings of the cabinet extension having within, or adjacent thereto, the mirrors 7, 8 and 2, respectively. The mirrors thus supported by the cabinet walls establish the aforesaid image-reflecting paths A and B in conjunction with the cabinet extension in the manner already explained and, in addition thereto, helps to define such image-reflecting paths. The opening 16, for instance, is of such limited width as will preclude in the mirror 5 extraneous image-reflections of the poser along the image-reflecting path A as might otherwise be reflected into the mirror 5, and the openings 18 and 19 provide and define avenues through and along which the image-reflecting path B lies to the mirrors 7 and 8 in the pose-reflecting relation to the concealed center mirror 2. The mirrors 1, 2, 5, 6, 7 and 8 may be provided with panelled backs (not llustrated) if desired. The image-reflecting paths A and B of the pose-reflecting apparatus thus being established and defined, it will be readily understood that a poser entering the cabinet 9 and posing at 3, will, if facing the center mirror 1, see in said mirror 1 his full face image as reflected directly to him thereby along the image-reflecting path D. By turning and facing the side mirror 5 he will see in the mirror 5 the back of his image as reflected therein by the mirrors 6 and 1 along the image-reflecting path A, the back view of his image in the mirror 5 will be entirely free from extraneous image-reflection by reason of the limited width of the mirror 5 which thereby eliminates the possibility of any direct reflection of the figure of the poser which otherwise would be seen in the mirror 5 because of its angle relation to the subject and other mirrors. By turning and looking through the openings 18, the poser will see in the side mirror 7 a side view of himself as reflected by the side mirror 8 into the concealed mirror 2 and from thence into the side mirror 7 along the image-reflecting path B. By turning to look through the opening 19, the poser will see in the side mirror 8 an opposite side view of himself as reflected by the side mirror 7 into the concealed mirror 2 and from thence into the side mirror 8 along the image-reflecting path B. The desired lighting effect within the cabinet 9 may be had by providing lighting units at convenient places upon the side walls, such as at 31, 32, 33 and 34. This pose-reflecting apparatus, while especially adapted for use in dress salons and like uses, is also adapted for all purposes where a pose-reflection is desired.

It is understood that with the improved apparatus, a posing subject, standing upon the pose-reflecting area 4 and turning his body and looking through any of the openings, may see in each mirror adjacent such openings a single reflection of himself within such openings, each single reflection varying in angles, and if, while the poser thus turns his body, he looks through the openings in consecutive order, he may see in the mirrors adjacent the openings the reflection of himself in sequence as to angles, the angles changing with the body movement.

Of course, if it is desired to see a greater number of reflected angles of the posing subject, the apparatus as illustrated is subject to expansion by employing additional sets of mirrors, all properly spaced, to thereby establish an increased number of image-reflecting paths.

I claim:

1. In a pose-reflecting apparatus comprising a combination of mirrors, including spaced center mirrors and sets of side mirrors, the mirrors of each of said sets being so obliquely disposed relative to a different one of said center mirrors that a posing subject may see in one of the center mirrors his image in full face or, by facing the side mirrors of either set, may see his image at various angles.

2. In a pose-reflecting apparatus comprising a combination of mirrors, including axially spaced center mirrors and sets of side mirrors, the mirrors of each of said sets being so obliquely disposed relative to a different one of said center mirrors that a posing subject may see in one of the center mirrors his image in full face, or, by facing the side mirrors of either set, may see his image at various angles.

3. In a pose-reflecting apparatus comprising a combination of mirrors, including axially spaced center mirrors and sets of side mirrors, the nearer center mirror reflecting a full face image of a posing subject when the latter faces said nearer mirror, the mirrors of each of said sets being so obliquely disposed relative to a different one of said center mirrors that a posing subject facing, one at a time, the side mirrors of either set may see his image at various angles.

4. In a pose-reflecting apparatus comprising a combination of fixed mirrors having axially spaced center mirrors of which one substantially conceals the other from the view of a posing subject; side mirrors obliquely disposed relative to one of said center mirrors so that the image of the posing subject in one of said side mirrors may be made visible to himself into another of said side mirrors by being reflected around a closed path having a certain conformation; and other side mirrors obliquely disposed relative to the other of said center mirrors, so as to form a closed path having a conformation different from the conformation of the first-mentioned path.

5. In a pose-reflecting apparatus comprising a hexagonally-shaped cabinet having an entrance in one side wall thereof; an opening in each of the other side walls; axially spaced center mirrors fixed adjacent the opening opposite said entrance; fixed side mirrors, each adjacent to the opening in one of those side walls which are adjacent the entrance and which diverge rearwardly, said side mirrors being so obliquely disposed relative to the nearer of the axially spaced center mirrors as to enable a posing subject to see in said side mirrors, one at a time, his image at different angles; and fixed side mirrors located externally of said cabinet and each adjacent the opening in one of those side walls which are adjacent said side mirror and which converge rearwardly, said last-mentioned side mirrors being so obliquely disposed relative to the farther center mirror as to enable the posing subject to see in said last-mentioned side mirrors, one at a time, his image at still further different angles.

6. In a pose-reflecting apparatus comprising a cabinet having a posing area and supporting axially spaced center mirrors and two sets of side mirrors, the mirrors of each set being obliquely disposed relative to a different one of said center mirrors, and thus forming a closed image-reflecting path, the side mirrors of one set being outside of the image-reflecting path of the other set.

7. In a pose-reflecting apparatus comprising a group of mirrors facing a posing area and including axially spaced center mirrors and two sets of side mirrors, the mirrors of each set being obliquely disposed relative to a different one of said center mirrors, and thus forming a closed image-reflecting path, the side mirrors of one set being outside of the image-reflecting path of the other set.

8. In a pose-reflecting apparatus comprising a cabinet having a posing area and a pose-reflecting set of mirrors, said set comprising a center mirror facing said area, and a mirror upon both sides of said area, said mirrors being obliquely disposed relative to said center mirror and forming a closed image-reflecting path, in combination with a second pose-reflecting set of mirrors comprising a center mirror parallel to and rearwardly spaced from the center mirror of said first set, and side mirrors laterally spaced from said center mirror of the first set and obliquely disposed relative to the rearwardly spaced center mirror and forming another closed image-reflecting path, the image-reflecting path of one set overlapping but not coinciding with the image-reflecting path of the other set.

9. In a pose-reflecting apparatus comprising a cabinet having walls enclosing a posing area; multiple openings of which one is provided in each of said walls, the opening in one wall providing an entrance to the posing area; axially spaced mirrors adjacent the opening in the wall opposite said entrance, the said mirrors facing toward the posing area; a side mirror adjacent the opening in each wall adjacent the entrance opening, said side mirrors being obliquely disposed relative to the nearer of said axially spaced center mirrors so that a posing subject is able either to see in said side mirrors, one at a time, his image at different angles or to see in said nearer mirror a full face image, the side mirror image travelling about a closed image-reflecting path; and other side mirrors laterally spaced from said nearer center mirror and so obliquely disposed relative to the farther of said axially spaced mirrors that said posing subject is able to see in said last-mentioned side mirrors, one at a time, his image at different angles other than those made visible in the first-mentioned side mirrors, said last-mentioned side mirror images also travelling about a closed image-reflecting path, the last mentioned image-reflecting path overlapping but not coinciding with the first mentioned image-reflecting path.

10. In a multi-pose-reflecting apparatus in combination with a center mirror unit consisting of multiple mirrors spaced apart so that each mirror is adapted to lie in a separate image-reflecting path, said image-reflecting paths differing from each other in conformation; fixed pairs of side mirrors angularly disposed relative to certain mirrors of the unit and one of each pair positioned on either side of the poser to lie in the image-reflecting path of its corresponding center mirror, whereby the poser may turn and look into any given one of said side mirrors and see a reflection of himself at that angle determined by the conformation of the image-reflecting path in which said given side mirror lies.

11. In a pose-reflecting apparatus comprising multiple sets of pose-reflecting mirrors in combination with a common posing area each set including a center mirror, the center mirror of one set concealing the center mirror of the other set from the view of the posing subject, the image-reflecting path of each set overlapping but not coinciding with the image-reflecting path of the other set.

LUTHER G. SIMJIAN.